United States Patent
Jasti et al.

(10) Patent No.: US 10,901,807 B2
(45) Date of Patent: Jan. 26, 2021

(54) COMPUTER SYSTEM WITH CONCURRENCY FOR MULTITHREADED APPLICATIONS

(71) Applicant: International Business Machines Corporation, Armonk, NY (US)

(72) Inventors: Sreepurna Jasti, Hyderabad (IN); Lakshmi Swetha Gopireddy, Ongole (IN); Gautam Mittal, kalka (IN); Gireesh Punathil, Kerala State (IN)

(73) Assignee: International Business Machines Corporation, Armonk, NY (US)

( * ) Notice: Subject to any disclaimer, the term of this patent is extended or adjusted under 35 U.S.C. 154(b) by 122 days.

(21) Appl. No.: 16/237,821

(22) Filed: Jan. 2, 2019

(65) Prior Publication Data
US 2020/0210247 A1   Jul. 2, 2020

(51) Int. Cl.
*G06F 9/52* (2006.01)
*G06F 9/48* (2006.01)

(52) U.S. Cl.
CPC .............. *G06F 9/52* (2013.01); *G06F 9/4881* (2013.01)

(58) Field of Classification Search
CPC ........................................................ G06F 9/52
See application file for complete search history.

(56) References Cited

U.S. PATENT DOCUMENTS

| | | | |
|---|---|---|---|
| 5,995,998 A | 11/1999 | Furlani et al. | |
| 7,797,704 B2 | 9/2010 | Anderson | |
| 2006/0072563 A1* | 4/2006 | Regnier | H04L 49/9094 370/389 |
| 2006/0225077 A1 | 10/2006 | Anderson | |
| 2009/0083517 A1 | 3/2009 | Riddle | |
| 2013/0080672 A1* | 3/2013 | Tal | G06F 9/526 710/200 |
| 2013/0232499 A1 | 9/2013 | Saha et al. | |
| 2014/0053157 A1 | 2/2014 | Zhao et al. | |
| 2017/0109217 A1 | 4/2017 | Raman et al. | |

OTHER PUBLICATIONS

"Utility Classes Commonly Useful in Concurrent Programming" and Interface Summary, From Java—java.util.concurrent.locks, accessed Dec. 17, 2018, 1 page. https://docs.oracle.com/javase/8/docs/api/index.html?java/util/concurrent/package-summary.html.
James et al., "Yield: Mainstream Delimited Continuations", Indiana University, Bloomington Indiana, 13 Pages.

* cited by examiner

*Primary Examiner* — Sisley N Kim
(74) *Attorney, Agent, or Firm* — Yee & Associates, P.C.

(57) ABSTRACT

Threads running in a computer system are managed. Responsive to a thread for an application attempting to acquire a lock to a shared computing resource to perform a task for the application, a determination is made by the computer system as to whether the lock for the shared computing resource was acquired by the thread for the application. An unrelated task for the application assigned by the computer system to the thread in an absence of a determination that the lock was acquired.

18 Claims, 8 Drawing Sheets

COMPUTER SYSTEM WITH CONCURRENCY FOR MULTITHREADED APPLICATIONS

BACKGROUND

1. Field

The disclosure relates generally to an improved computer system and, more specifically, to a method, an apparatus, a system, and a computer program product for managing threads running concurrently in a computer system.

2. Description of the Related Art

Applications can increase responsiveness using a multithreaded design. For example, a multithreaded design can be used in Web servers to increase responsiveness to requests from clients such as browsers running on computing devices. A multithreaded application can employ a thread pool, which contains threads, to perform work in response to receiving the requests. Each of these threads can be interchangeably used to perform work in the form of tasks for the application. With the threads being interchangeable, a request for performing tasks by the application can be performed by any thread within the thread pool. The threads can share the same code and data. The code is read only while the data can be read and written.

Multiple threads can perform read and write operations on shared data. Locks are currently used to regulate shared data access by the threads. Currently, when one thread is waiting for a lock to access shared data while another thread is accessing the shared data, the lock is kept as a condition variable monitored by the operating system. The operating system saves the context of the thread for later use; the central processor unit (CPU) is relinquished from the thread; and the operating system places the thread into a wait queue. When the central processor unit is relinquished, the operating system can assign the central processor unit to another thread that is ready to pick up or continue another task in the same process or assign the central processor unit to another thread to perform a task for another process or application. Further, the processor unit can be can become idle if no other work is present requiring processor resources.

SUMMARY

According to one embodiment of the present invention, a method manages threads running in a computer system. Responsive to a thread for an application attempting to acquire a lock to a shared computing resource to perform a task for the application, a determination is made, by the computer system, as to whether the lock for the shared computing resource was acquired by the thread for the application. An unrelated task for the application is assigned by the computer system to the thread in response to an absence of a determination that the lock was acquired.

According to another embodiment of the present invention, a concurrency management system comprises a computer system that determines whether a lock for a shared computing resource was acquired by a thread for an application in response to the thread for the application attempting to acquire the lock to the shared computing resource to perform a task for the application. The computer system assigns an unrelated task for the application to the thread in an absence of a determination that the lock was acquired.

According to yet another embodiment of the present invention, a computer program product for managing threads running in a computer system comprises a computer-readable storage media, first program code, and second program code stored on the computer-readable storage media. The first program code is run to determine whether a lock for a shared computing resource was acquired by a thread for an application in response to the thread for the application attempting to acquire the lock to the shared computing resource to perform a task for the application. The second program code is run to assign an unrelated task for the application to the thread in the absence of a determination that the lock was acquired.

DETAILED DESCRIPTION

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retains and stores instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented with programming language such as Smalltalk, C++ or the like, and conventional procedural programming languages, such as the "C" programming language or similar programming languages. The computer-readable program instructions may run entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may process the computer-readable program instructions by utilizing state information of the computer-readable program instructions to personalize the electronic circuitry, in order to perform aspects of the present invention.

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer program instructions may be provided to a processor of a general-purpose computer, special purpose computer, or other programmable data processing apparatus to produce a machine, such that the instructions, which are processed via the processor of the computer or other programmable data processing apparatus, create means for implementing the functions/acts specified in the flowchart and/or block diagram block or blocks. These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which run on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be processed substantially concurrently, or the blocks may sometimes be processed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The illustrative embodiments recognize and take into account a number of different considerations. For example, the illustrative embodiments recognize and take into account that multiple threads needing access to shared data can cause bottlenecks to concurrency.

The illustrative embodiments recognize and take into account that the extent to which the performance degradation occurs can be a function of the extent of data modification needed in the shared data records and the criticality of the shared data itself. For example, limited or no concurrency occurs if a number of threads in the thread pool want to access a shared cache and the modification time for the shared data in the cache is quite substantial compared to the overall transaction for performing a specific task. Further, if every thread in the thread pool wants to access the shared data in the cache before the main stream code flow starts, the shared data access becomes a bottleneck and limited or no concurrency is present for the brief period of time when the access to the shared data in the cache occurs. As a result, limited or no concurrency is present in the system.

The illustrative embodiments recognize and take into account that, currently, a lock mechanism is employed through the operating system to control access to shared resources. The illustrative examples recognize and take into account that when one thread is waiting for a lock to access the shared data while another thread is accessing the shared data, the lock word is kept as a condition variable that is monitored by the operating system. In this case, the illustrative examples recognize and take into account that the context of the thread is saved for later restoration, the processor is relinquished from the thread, and the thread is placed in a wait queue which manages all these threads for multiple applications, which are waiting for an event or condition to occur.

In this situation, the illustrative embodiments recognize and take into account that the processor relinquished from the waiting thread may be assigned to another thread which is ready to pick up or continue another transaction of the same process but is in the runnable queue. The illustrative embodiments recognize and take into account that the processor relinquished from the waiting thread may be assigned to a thread which is ready to pick up or continue a transaction for another process in another application. Further, the illustrative embodiments recognize and take into account that the central processor unit relinquished from the waiting thread can be deemed idle as there is no other active work in the system for which a processor is needed.

The illustrative embodiments recognize and take in account that a disadvantage of this approach using the operating system is that the available processors, such as central processor units or processor cores, can be assigned to another task for another application. The illustrative embodiments recognize and take into account that the operating system does not take into consideration whether a task provided to the processor is for the same application or a different application. As result, the illustrative embodiments recognize and take account that the application can become less responsive than desired even with a multithreaded design.

Thus, the illustrative embodiments provide a method, an apparatus, a system, and a computer program product to manage shared data access in multithreaded application programs in an efficient manner. The management of shared data access can be performed on an application basis and can be performed without operating system assistance to schedule another task, process, or thread. In one illustrative example, a mechanism is implemented within the application to manage the processing of unrelated tasks when a block for a shared computing resource is unavailable. The illustrative embodiments reassign a thread to another task for the same application when a lock cannot be obtained for a current task being processed by the thread. In other words, the thread is not assigned a task from another application.

In one illustrative embodiment, a method manages threads running in a computer system. Responsive to a thread for an application attempting to acquire a lock to a shared computing resource to perform a task for the application, the computer system determines whether the lock for the shared computing resource was acquired by the thread for the application. The computer system assigns an unrelated task to be performed for the application to the thread in an absence of a determination that the lock was acquired.

Figure 1:
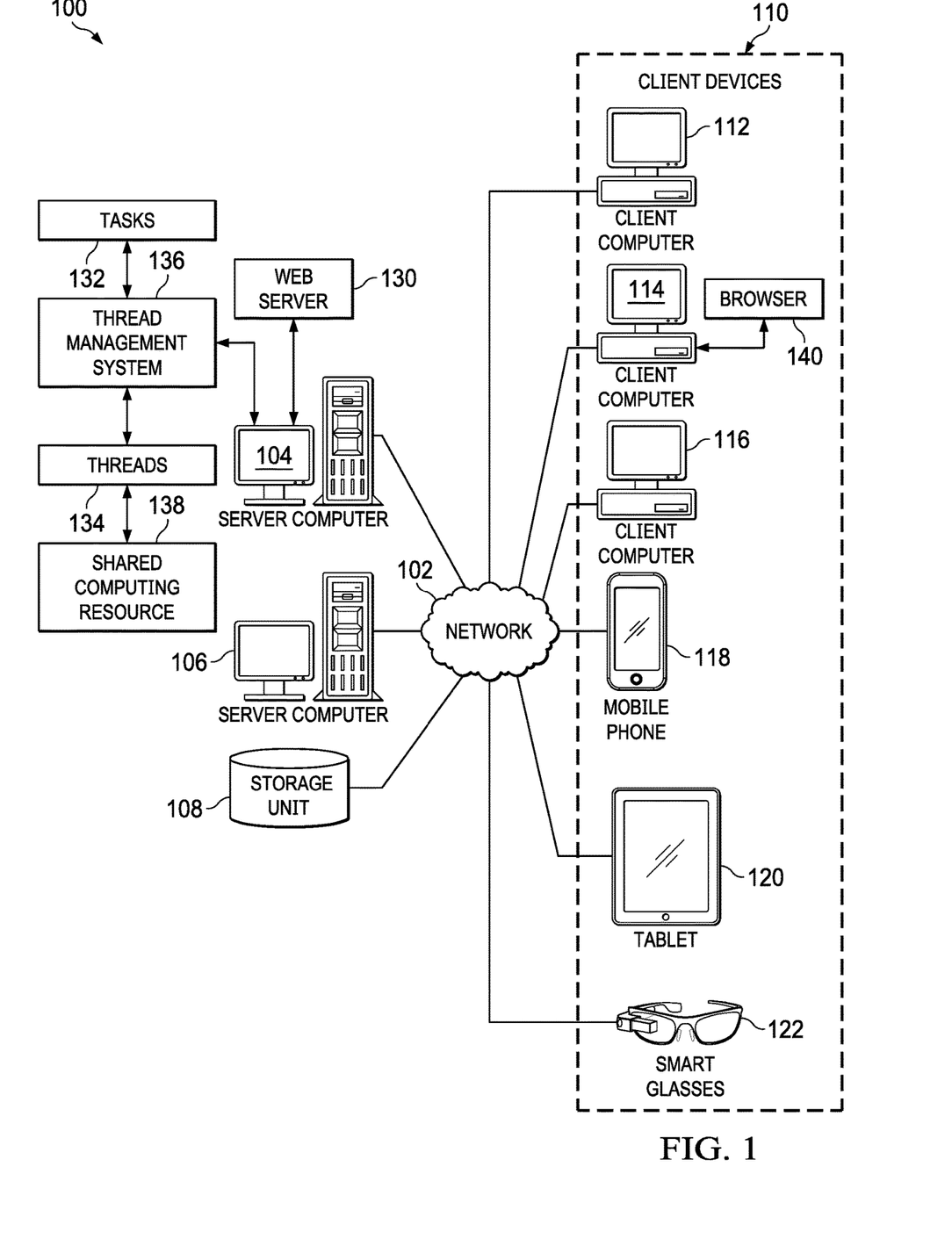
FIG. 1 is a pictorial representation of a network of data processing systems in which illustrative embodiments can be implemented.

With reference now to the figures and, in particular, with reference to FIG. 1, a pictorial representation of a network of data processing systems is depicted in which illustrative embodiments can be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client devices 110 connect to network 102. As depicted, client devices 110 include client computer 112, client computer 114, and client computer 116. Client devices 110 can be, for example, computers, workstations, or network computers. In the depicted example, server computer 104 provides information, such as boot files, operating system images, and applications to client devices 110. Further, client devices 110 can also include other types of client devices such as mobile phone 118, tablet computer 120, and smart glasses 122. In this illustrative example, server computer 104, server computer 106, storage unit 108, and client devices 110 are network devices that connect to network 102 in which network 102 is the communications media for these network devices. Some or all of client devices 110 may form an Internet-of-things (IoT) in which these physical devices can connect to network 102 and exchange information with each other over network 102.

Client devices 110 are clients to server computer 104 in this example. Network data processing system 100 may include additional server computers, client computers, and other devices not shown. Client devices 110 connect to network 102 utilizing at least one of wired, optical fiber, or wireless connections.

Program code located in network data processing system 100 can be stored on a computer-recordable storage medium and downloaded to a data processing system or other device for use. For example, program code can be stored on a computer-recordable storage medium on server computer 104 and downloaded to client devices 110 over network 102 for use on client devices 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). FIG. 1 is intended as an example, and not as an architectural limitation for the different illustrative embodiments.

As used herein, "a number of," when used with reference to items, means one or more items. For example, "a number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

In one illustrative example, web server 130 running on server computer 104 is a multithreaded application. Web server 130 performs tasks 132 to processes requests from client device 110 in this illustrative example. The processing of tasks 132 is performed using threads 134 running on server computer 104. These threads are used to perform tasks 312 for web server 130 in a nonblocking manner. In this illustrative example, a nonblocking lock occurs when the thread requesting to access shared data cannot obtain a lock to the shared data and the task of the thread is not is not transferred to another thread.

As depicted, thread management system 136 implements this mechanism for managing threads 134 in a non-blocking manner. In this illustrative example, thread management system 136 determines whether the lock for shared computing resource 138 was acquired by a thread in threads 134 for web server 130. In this illustrative example, shared computing resource 138 can be, for example, a shared data structure such as a database, a table, a record, or some other suitable type of data. The shared data in the shared data structure can be, for example, financial data, a directory, or other types of data for which shared access is desired. Thread management system 136 assigns the thread an unrelated task in tasks 132 to be performed for web server 130 in the absence of a determination that the lock was acquired.

The illustration of managing threads running in server computer 104 for web server 130 is provided as one example of a multithreaded application that can implement concurrency management. This example is not meant to limit the manner in which concurrency management can be implemented in other illustrative samples. As another illustrative example, a multithreaded application, such as browser 140, running on client computer 114 also can use thread management system 136 to manage the performance of tasks for browser 140. With this type of the limitation, browser 140 can have its own set of threads which are managed in a manner similar to threads 134 for web server 130.

Figure 2:
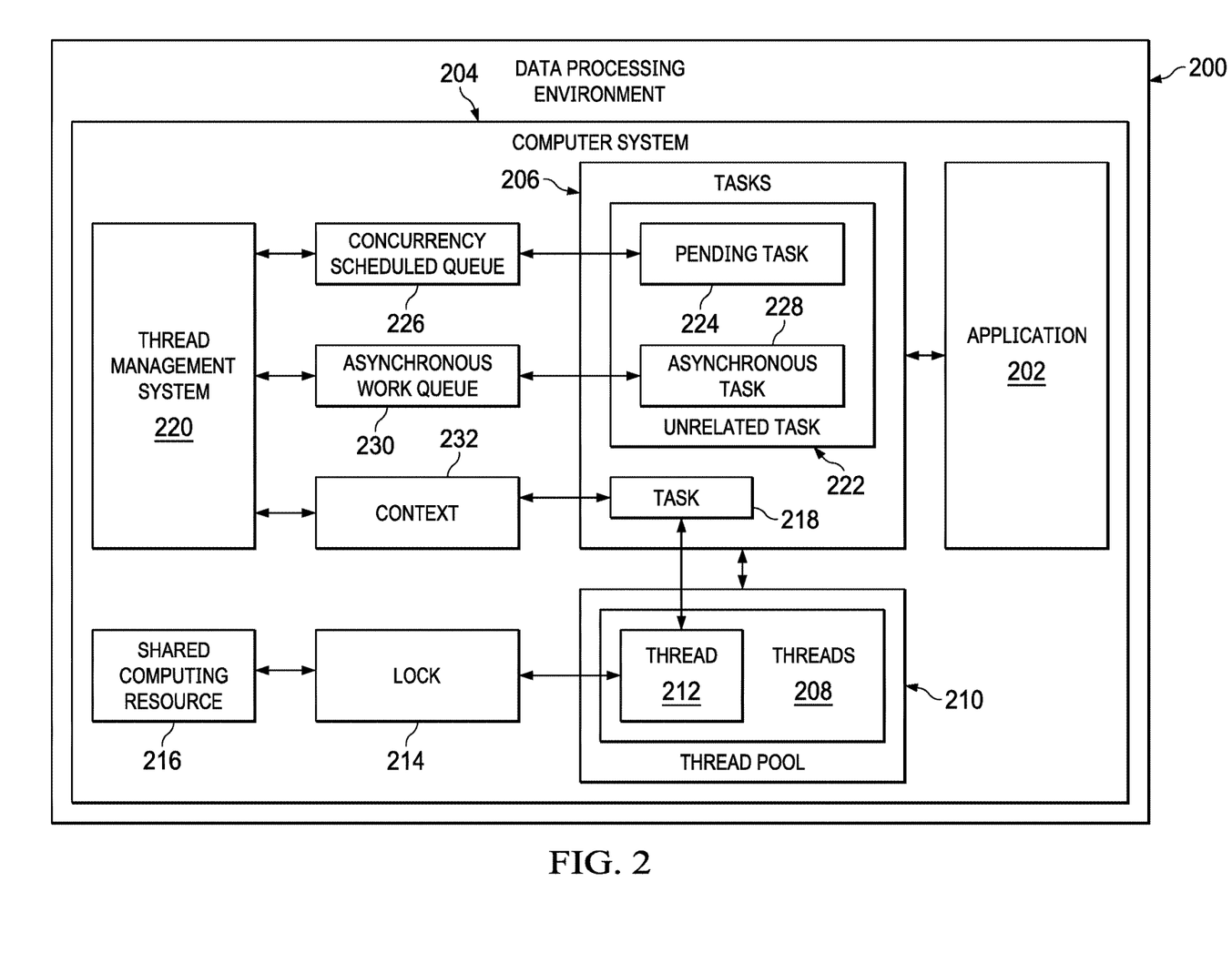
FIG. 2 is a block diagram of a data processing environment in accordance with an illustrative embodiment.

With reference now to FIG. 2, a block diagram of a data processing environment is depicted in accordance with an illustrative embodiment. In this illustrative example, data processing environment 200 includes components that can be implemented in hardware such as the hardware shown in network data processing system 100 in FIG. 1.

In data processing environment 200, application 202 runs on computer system 204. Computer system 204 is a physical hardware system and includes one or more data processing systems. When more than one data processing system is present in computer system 204, those data processing systems are in communication with each other using a communications medium. The communications medium can be a network. The data processing systems can be selected from at least one of a computer, a server computer, a tablet computer, or some other suitable data processing system.

Application 202 operates to perform tasks 206. As depicted, application 202 can take a number of different forms. For example, application 202 can be selected from a group of comprising a web server, a browser, a database management system that interacts with a database, a word processor, a spreadsheet application, a computer-aided design program, a mobile application, an image processing application, and other suitable types of applications.

In this illustrative example, tasks 206 are performed by application 202 using threads 208 in thread pool 210. A thread is a smallest sequence of program instructions that can be managed independently by a scheduler. Multiple threads can exist in a process in application 202 in which these threads share executable code and share computing resources such as a memory or a data structure. A thread is also referred to as a "thread of execution". For example, a thread can process a command or other piece of work referred to as a task. In other words, the thread is the mechanism for performing work, and the task is the work that is performed by the mechanism.

In this illustrative example, responsive to thread 212 in threads 208 for application 202 attempting to acquire lock 214 to shared computing resource 216 to perform task 218 in tasks 206 for application 202, thread management system 220, running on computer system 204, determines whether lock 214 for shared computing resource 216 was acquired by thread 212 for application 202.

In the illustrative example, shared computing resource 216 is a resource that requires a lock for access. Shared computing resource 216 can take a number of different forms. For example, shared computing resource 216 can be selected from a group comprising data, a data structure, a database, a database record, a table, an array, a memory location, a cache, an output device, a printer, a display device, an input/output port, or some other shared computing resource for which access is controlled using a lock.

Thread management system 220 assigns unrelated task 222 to be performed for application 202 to thread 212 in the absence of a determination that lock 214 was acquired. In other words, thread management system 220 assigns thread 212 another task that is unrelated to task 218 when thread 212 is unable to obtain lock 214 to shared computing resource 216 to perform task 218. In this instance, lock 214 is nonblocking in data processing environment 200 in contrast to the current types of blocking locks used without thread management system 220.

In this illustrative example, unrelated task 222 can be identified by thread management system 220 based on a list of unrelated tasks. The list of unrelated tasks can be provided by application 202 or some other suitable source.

In the illustrative example, unrelated task 222 is one or more instructions in application 202 that do not cause side effects to task 218 when task 218 is de-scheduled as a result of an inability to obtain lock 214 to shared computing resource 216. In the illustrative example, a side effect occurs when a thread performing a first task has a lock to shared data and modifies shared data in which incomplete modifications have been made to the shared data by another thread.

In the illustrative example, a thread that performs a first task should not change the shared data that is already being modified by another thread performing a second task. When performance of the first task does not interfere with the shared data, the first task is an unrelated task to the second task in this illustrative example.

For example, a thread can perform a task for a banking transaction for a web server that involves updating a database record with new credit information. In this example, the database is abstracted as shared data in the form of an in-memory data structure that holds the database record with the credit information. The in-memory data structure requires a lock for threads to access the in-memory data structure. In this example, thread A attempts to acquire a lock to the in-memory data structure but fails because thread B has the lock and is accessing the in-memory data structure. In this case, thread A is assigned an unrelated task that does not require access to the in-memory data structure.

In the illustrative examples, the unrelated task can include logging the current metrics of the application. These metrics can include the use of a central processor unit (CPU), a memory, a network, and a disk. This activity causes no side effects to the halted task to update credit information in the database record in the in-memory data structure that was being performed by thread A. This task of logging metrics can be performed before the credit information update, in between the credit information update, or after the credit information update without affecting the shared credit information for the database record in the in-memory data structure.

As another example, the unrelated task can update the session history by identifying clients connected to a web server and identifying those clients which have sessions that have expired or about to expire. This task can include sending alert messages to the affected clients. This type of task is unrelated because the task does not affect or is not affected by the task for updating the credit information that has been halted. In the illustrative examples, the unrelated tasks are independent pieces of work that are integral parts of the application, but are structurally disconnected with tasks that work with shared data for the database record in the in-memory data structure.

As depicted, thread management system 220 performs task 218 for application 202 in response to lock 214 being acquired. In the absence of a determination that lock 214 was acquired, thread management system 220 can assign unrelated task 222 for application 202 in a number of different ways.

For example, thread management system 220 can determine whether pending task 224 is present for application 202. In this illustrative example, pending task 224 is one or more instructions in application 202 that run to access data. This data can be shared across multiple threads. With pending task 224, a thread processing pending task 224 had previously failed to acquire a lock to access the shared data. As result, the continued flow or processing of pending task 224 was halted at that point.

Thread management system 220 can assign pending task 224 to thread 212 in response to pending task 224 being present for application 202. The processing of pending task 224 can continue and can include attempting to acquire the lock the shared data needed for performing pending task 224. In this illustrative example, pending task 224 can be located in a queue, such as concurrency scheduled queue 226.

As another example, thread management system 220 can determine whether asynchronous task 228 is present for application 202. In this depicted example, asynchronous task 228 can be located in a queue, such as asynchronous work queue 230. In response to asynchronous task 228 being present for application 202, thread management system 220 can assign asynchronous task 228 to thread 212. In this illustrative example, all of the tasks in concurrency scheduled queue 226 and asynchronous work queue 230 are for application 202 and not for other applications.

With both types of task assignment for thread 212, thread management system 220 saves context 232 for task 218. Further, thread management system 220 also adds task 218 to concurrency scheduled queue 228 as a pending task. In this illustrative example, concurrency scheduled queue 226 is a first-in-first-out (FIFO) queue and task 218 is added as a pending task to the end or tail of concurrency scheduled queue 226.

Thus, thread 212 can be assigned to another task for application 202 when thread 212 is unable to obtain lock 214 to shared computing resource 216 that is needed to perform task 218. Further, thread 212 can process task 218 at a later time when lock 214 for shared computing resource 216 is acquired by thread 212 at a later time for processing task 218.

By assigning another task to be performed for application 202, such as pending task 224 or asynchronous task 228, to thread 212, application 202 can run in a more responsive manner in processing tasks 206. This mechanism avoids having the processor being idle or reassigned to another thread to process a task for a different application. In this example, thread 212 is not idle or placed into a sleep state until lock 214 for shared computing resource 216 needed by thread 212 for task 218 is released. As result, the processor resources used by thread 212 are not released but can be used to perform other tasks for application 202.

Figure 3:
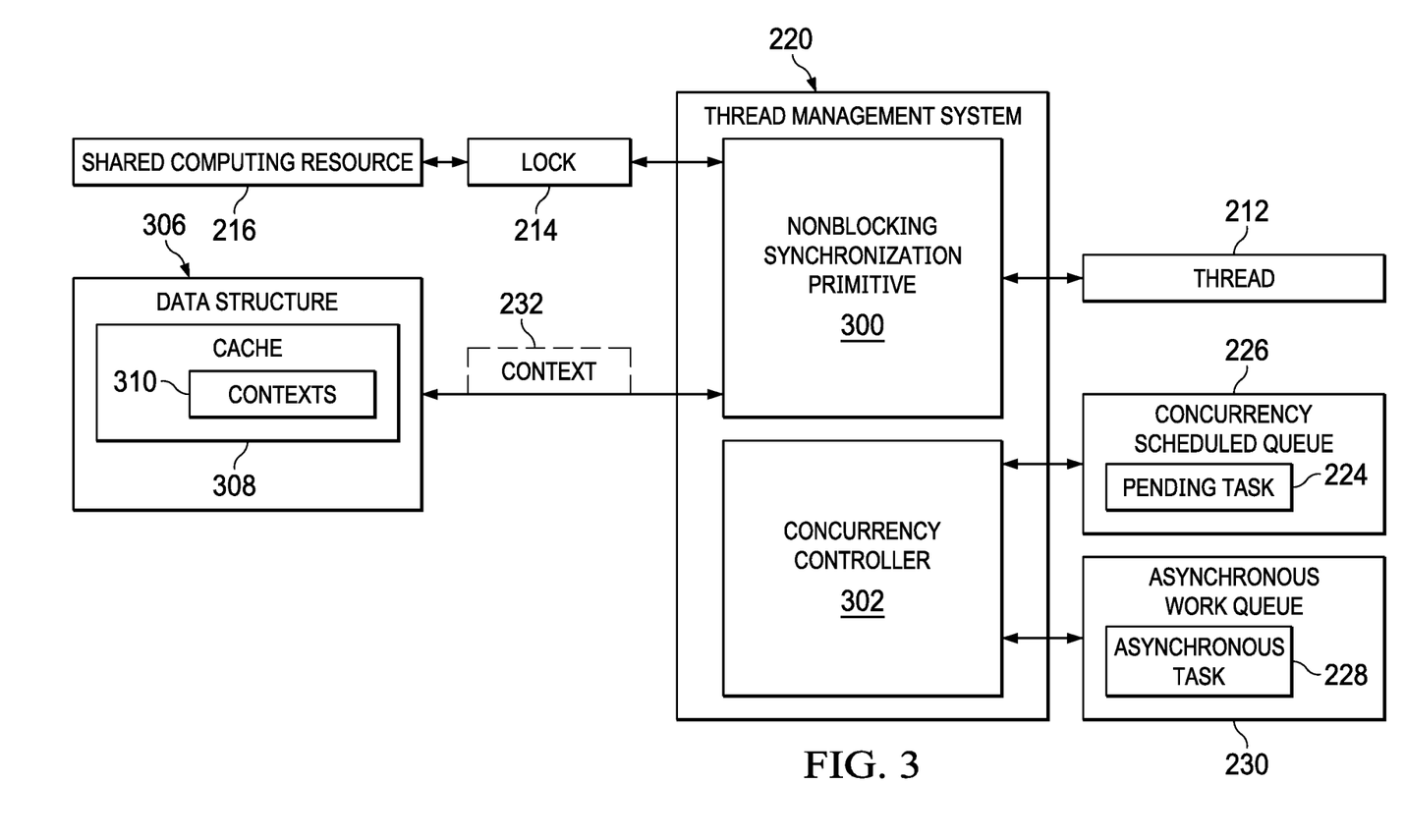
FIG. 3 is a block diagram illustrating components in a thread management system in accordance with an illustrative embodiment.

With reference next to FIG. 3, a block diagram illustrating components in a thread management system is depicted in accordance with an illustrative embodiment. In the illustrative examples, the same reference numeral may be used in more than one figure. This reuse of a reference numeral in different figures represents the same element in the different figures.

In this illustrative example, thread management system 220 includes a number of different components. As depicted, thread management system 220 comprises nonblocking synchronization primitive 300 and concurrency controller 302. These two components are an example of one implementation for thread management system 220 that operate to manage the performance of tasks when a desired lock is unavailable for a current task being processed by thread.

A primitive, such as nonblocking synchronization primitive 300, is a segment of program code and can be a smallest unit of processing that is available for given language or machine. A primitive can be, for example, a synchronization mechanism used to indicate when a particular condition has become true such as when a lock is obtained. The small size of a primitive can aid applications to effectively perform tasks such as determining when a lock has been obtained.

For example, when thread 212 desires access to shared computing resource 216, nonblocking synchronization primitive 300 determines whether attempts to acquire lock 214 for shared computing resource 216 are successful. If lock 214 is obtained by nonblocking synchronization primitive 300 for thread 212, thread 212 runs to perform task 218 using shared computing resource 216.

In this illustrative example, thread 212 runs to perform task 218 using shared computing resource 216 with a control flow as defined by application 202. In this example, a control flow is a sequence of program blocks or expressions, the sequence of which is decided by the control expressions in the program such as "if", "else", "for", and other control expressions. An application, for example, can provide a function name as the entry point of the control flow to a thread, and the thread will follow the control flow by processing those instructions in a central processing unit or other processor resource.

On the other hand, if lock 214 cannot be obtained by nonblocking synchronization primitive 300 for thread 212, nonblocking synchronization primitive 300 yields the control of thread 212 to concurrency controller 302. Further, nonblocking synchronization primitive 300 saves context 232 to data structure 306. In this illustrative example, data structure 306 is cache 308. In this illustrative example, cache 308 stores contexts 310 for pending tasks for which locks to shared computing resources have not been obtained.

A context for a task contains information needed for a thread to pick up where the thread left off when performing the task. For example, context 232 for task 218 contains all of the information needed to resume performing task 218 when lock 214 is obtained for shared computing resource 216. In this illustrative example, context 232 can include at least one of central processor unit (CPU) registers, a thread stack, a thread identifier, an instruction pointer to resume operation, values for variables, or other suitable information that is used to resume performing task 218 at a later time.

When task 218 is resumed, this task can be assigned to thread 212. Alternatively, task 218 can be assigned to another thread in threads 208 used to perform tasks 206 for application 202.

Further, an identifier for task 218 is placed into concurrency scheduled queue 226. This identifier in essence places task 218 into concurrency scheduled queue 226 with other pending tasks that have not been completed because access to a shared computing resource needed for those pending tasks were not accessible. In this illustrative example, task 218 can be placed into concurrency scheduled queue 226 using an identifier to identify task 218 and a pointer to context 232 stored in cache 308. In this particular illustrative example, the pending tasks in concurrency scheduled queue 226 include identifiers and pointers to contexts 310 in cache 308.

When control is passed to concurrency controller 302 from nonblocking synchronization primitive 300, concurrency controller 302 identifies and assigns unrelated task 222 for processing by thread 212. In other words, thread 212 is not put into a sleep or wait state. Instead, thread 212 performs another task that is unrelated to task 218.

In the illustrative example, a generator pattern can be used in thread management system 220 to implement the manner in which threads 208 are controlled in performing tasks 206. In an illustrative example, a generator pattern is a process that can control the iteration behavior of a loop. The generator pattern can be used to define custom iteration behaviors to data structures, with the iterator capable of implicitly maintaining their internal state. In this illustrative example, when a code sequence makes use of generator pattern semantics and yields to the invoking sequence, the calling context is automatically saved. Next, the invocation of the sequence unrolls this context, and the execution resumes from the very next instruction, without breaking the continuity.

For example, web servers can utilize thread management system 220 to process tasks. Web servers typically cater to transactional workload that has relatively well-defined life cycles and relatively predictable program control points. While concurrency is still a function of the vitality of the locks and the span of the code block under lock, the lock nature, waiting behavior, contention characteristics, and other factors can be empirically calculated into a heuristic, and the asynchronous tasks can be better designed and queued into the asynchronous work queue to use the process of thread management system 220.

As depicted, thread management system 220 can be implemented in software, hardware, firmware, or a combination thereof. When software is used, the operations performed by thread management system 220 can be implemented in program code configured to run on hardware, such as a processor unit. When firmware is used, the operations performed by thread management system 220 can be implemented in program code and data and stored in persistent memory to run on a processor unit. When hardware is employed, the hardware may include circuits that operate to perform the operations in thread management system 220.

In the illustrative examples, the hardware may take a form selected from at least one of a circuit system, an integrated circuit, an application-specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

In one illustrative example, one or more technical solutions are present that overcome a technical problem with current operating systems managing threads in a blocking manner that results in processors such as CPUs or processor cores being assigned to a task for another application resulting in the application being less responsive than desired even with a multithreaded design. As a result, one or more technical solutions may provide a technical effect in which threads are assigned to an unrelated task when locks cannot be obtained for tasks currently being processed by the threads. As a result, one or more technical solutions may provide a technical effect of maintaining or increasing at least one of the responsiveness or speed at which an application can process work.

Computer system 204 can be configured to perform at least one of the steps, operations, or actions described in the different illustrative examples using software, hardware, firmware, or a combination thereof. As a result, computer system 204 operates as a special purpose computer system in which thread management system 220 in computer system 204 enables assigning an unrelated task to a thread processing a task for which a lock cannot be obtained to access a shared computing resource. In particular, thread management system 220 transforms computer system 204 into a special purpose computer system as compared to currently available general computer systems that do not have thread management system 220.

The illustration of data processing environment 200 and the components of data processing environment 200 in FIG. 2 and FIG. 3 are not meant to imply physical or architectural limitations to the manner in which an illustrative embodiment can be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, context 232 can be saved into other types of data structures in addition to or in place of cache 308. For example, data structure 306 can be a linked list, a table, a database, or some other suitable type of data structure.

In the illustrative example, thread management system 220 can be implemented in a number of different locations.

For example, thread management system 220 can be implemented on an application level such as within one or more components in middleware, an application server, or other software frameworks or constructs. Further, thread management system 220, when implemented on the application level, can be implemented using the same programming language as the applications for which threads are managed.

Thread management system 220 can also be implemented on a per application basis in which each application can have a thread management system. With this type of implementation, the middleware is in the same language as the application and has an understanding of the semantics of the application which can be used for identifying and assigning unrelated tasks to threads.

Further, thread management system 220 can also be implemented in an operating system. With an operating system implementation, modifications can be made to provide a mechanism to communicate details of what are unrelated tasks. For example, a library for a data structure can be included for access by the operating system to identify what is an unrelated task. Further, the information about entry points for unrelated tasks can also be included for use by the operating system to control the assignment of unrelated tasks to threads.

Figure 4:
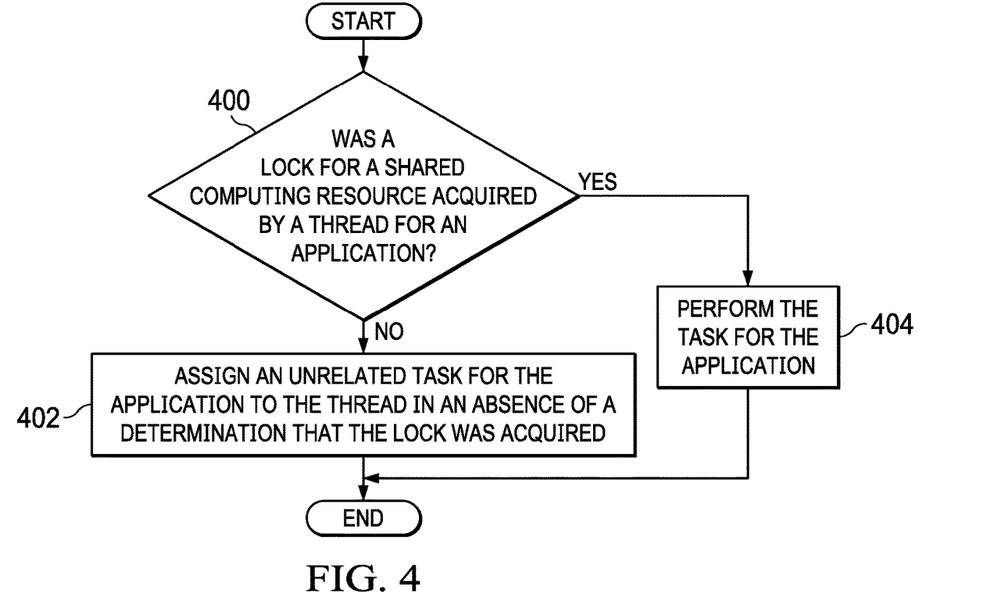
FIG. 4 is a flowchart of a process for managing threads running in a computer system in accordance with an illustrative embodiment.

Turning next to FIG. 4, a flowchart of a process for managing threads running in a computer system is depicted in accordance with an illustrative embodiment. The process in FIG. 4 can be implemented in hardware, software, or both. When implemented in software, the process can take the form of program code that is run by one of more processor units located in one or more hardware devices in one or more computer systems. For example, the process can be implemented in thread management system 220 in computer system 204 in FIG. 2. The process in FIG. 4 is performed in a nonblocking manner.

Responsive to a thread for an application attempting to acquire a lock to a shared computing resource to perform a task for the application, the process determines whether a lock for a shared computing resource was acquired by a thread for an application (step 400). The process assigns an unrelated task for the application to the thread in an absence of a determination that the lock was acquired (step 402). The process terminates thereafter.

With reference again to step 400, if the lock was acquired by the thread, the process performs the task for the application using the thread (step 404). The process terminates thereafter.

Figure 5:
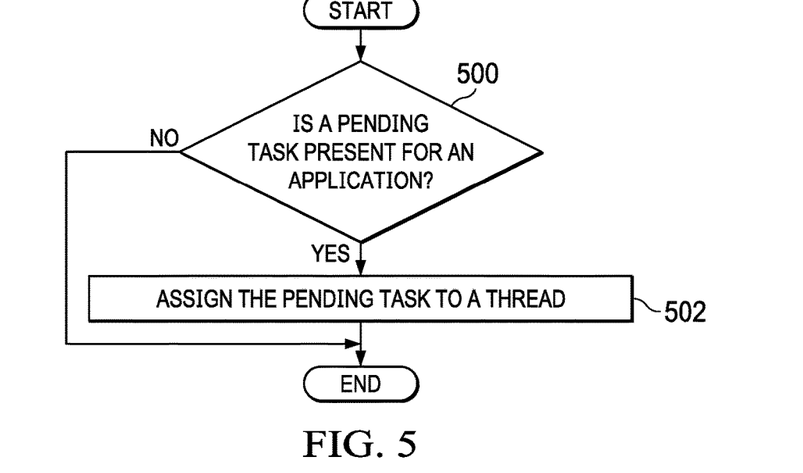
FIG. 5 is a flowchart of a process for assigning an unrelated task in accordance with an illustrative embodiment.

With reference now to FIG. 5, a flowchart of a process for assigning an unrelated task is depicted in accordance with an illustrative embodiment. The process illustrated in the flowchart in FIG. 5 is an example of one manner in which an unrelated task can be assigned in step 402 in FIG. 4.

The process begins by determining whether a pending task is present for an application (step 500). This determination can be made by checking a queue, such as concurrency scheduled queue 226, to determine whether a pending task is for the application.

The process assigns the pending task to a thread in response to the pending task being present for the application (step 502). The process terminates thereafter. If multiple pending tasks are present in concurrency scheduled queue 226 in step 502, the pending task at the head of the queue is selected for assignment to the thread. With reference again to step 502, if a pending task is not present, the process terminates.

Figure 6:
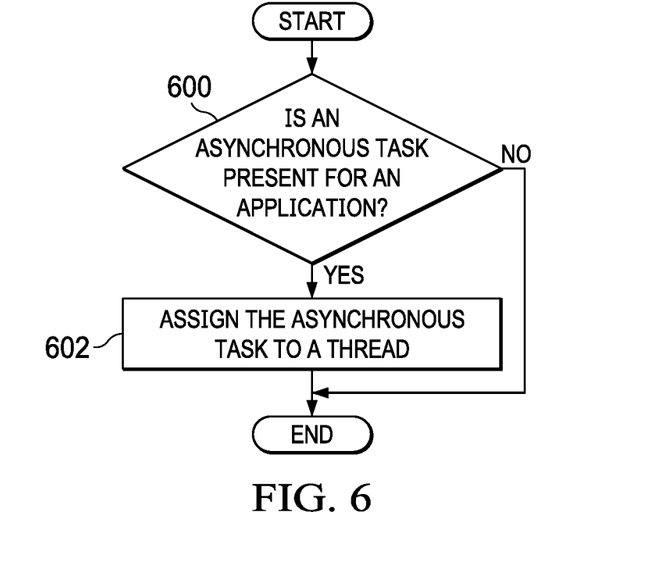
FIG. 6 is a flowchart of a process for assigning an unrelated task in accordance with an illustrative embodiment.

With reference now to FIG. 6, a flowchart of a process for assigning an unrelated task is depicted in accordance with an illustrative embodiment. The process illustrated in the flowchart in FIG. 6 is an example of another manner in which an unrelated task can be assigned in step 402 in FIG. 4.

The process begins by determining whether an asynchronous task is present for an application (step 600). The determination in step 600 can be made by checking a queue, such as asynchronous work queue 230 in FIG. 2, to determine whether any asynchronous tasks for the application are present for processing.

The process assigns the asynchronous task to a thread in response to the asynchronous task being present for the application (step 602). Otherwise, the process terminates.

Figure 7:
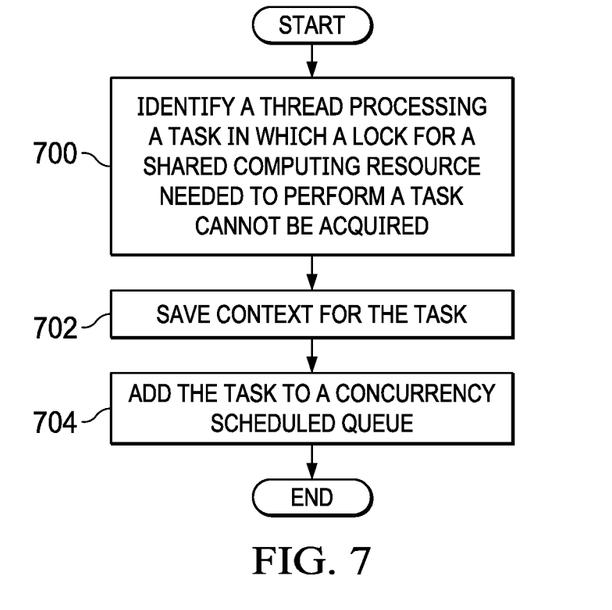
FIG. 7 is a flowchart of a process for halting processing of a task by a thread in accordance with an illustrative embodiment.

In FIG. 7, a flowchart of a process for halting processing of a task by a thread is depicted in accordance with an illustrative embodiment. The process in FIG. 7 can be implemented in hardware, software, or both. When implemented in software, the process can take the form of program code that is run by one of more processor units located in one or more hardware devices in one or more computer systems. For example, the process can be implemented in thread management system 220 in computer system 204 in FIG. 2.

The process begins by identifying a thread processing a task in which a lock for a shared computing resource needed to perform a task cannot be acquired (step 700). The process saves context for the task (step 702). In this depicted example, the context includes information needed to resume processing the task at the point where processing was halted because of an inability to obtain the lock for the shared computing resource.

The process adds the task to a concurrency scheduled queue (step 704). The process terminates thereafter. In step 704, the task can be added by adding an identifier for the task and a pointer to the context saved for the task.

Figure 8:
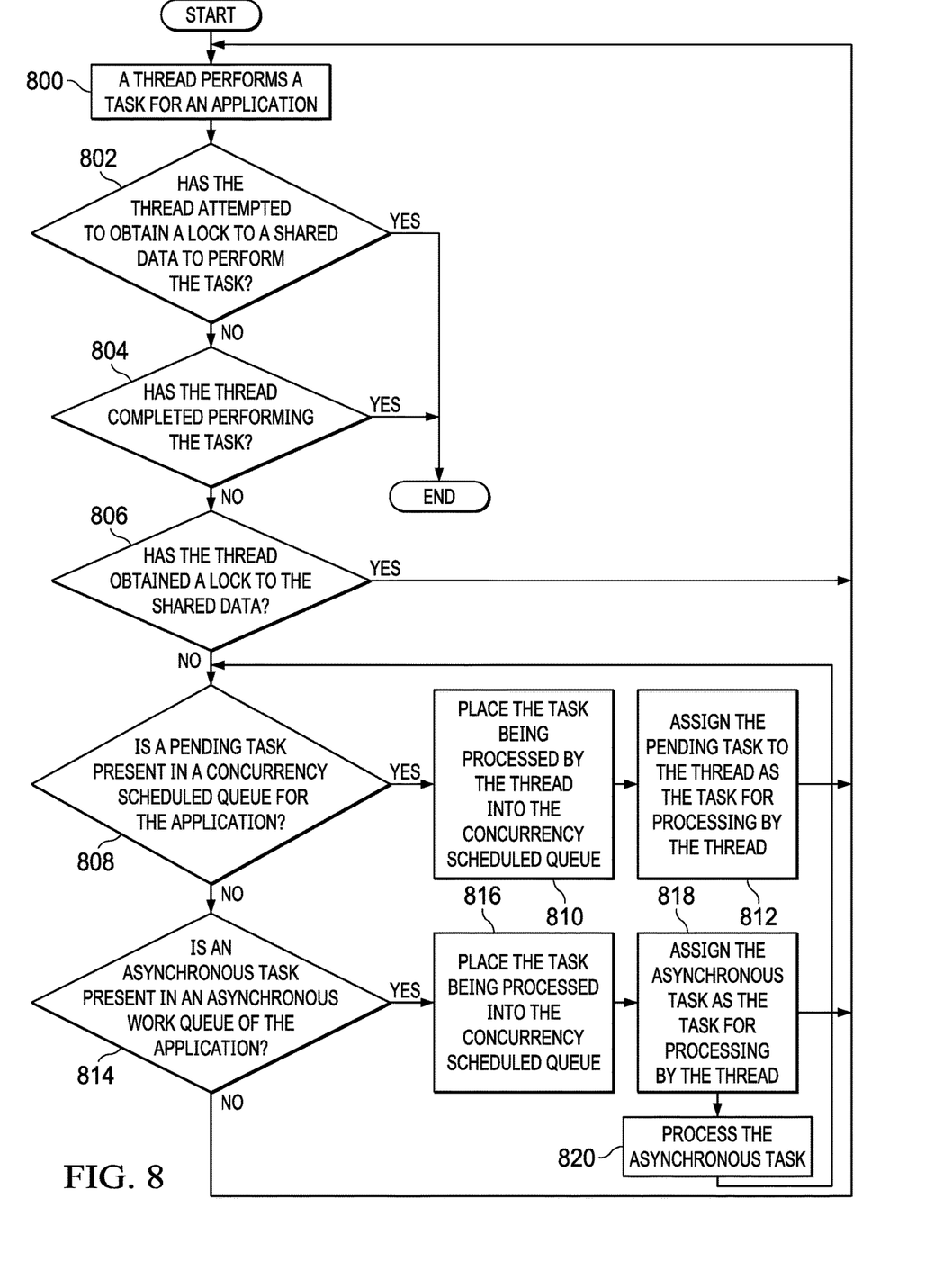
FIG. 8 is a flowchart of a process for managing threads running in a computer system in accordance with an illustrative embodiment.

Turning next to FIG. 8, a flowchart of a process for managing threads running in a computer system is depicted in accordance with an illustrative embodiment. The process in FIG. 8 can be implemented in hardware, software, or both. When implemented in software, the process can take the form of program code that is run by one of more processor units located in one or more hardware devices in one or more computer systems. For example, the process can be implemented in thread management system 220 in computer system 204 in FIG. 2.

The process begins with a thread performing a task for an application (step 800). A determination is made as to whether the thread has completed performing the task (step 804). If the process has completed performing the task, the process terminates.

Otherwise, a determination is made as to whether the thread has obtained a lock to the shared data (step 806). If the thread has obtained a lock to the shared data, the thread process returns to step 800 to perform the task using the shared data.

If the thread has not obtained the lock to the shared data in step 806, the process determines whether a pending tasks is present in a concurrency scheduled queue for the application (step 808). If a pending task is present in the concurrency scheduled queue, the process places the task being processed by the thread into the concurrency scheduled queue (step 810) and assigns the pending task to the thread as the task for processing by the thread (step 812). In step 810, the task is at the head of the queue when more than one pending task is present in the concurrency scheduled queue. The process then returns to step 800.

With reference back to step 808, if a pending task is not present, the process determines whether an asynchronous task is present in an asynchronous work queue of the application (step 814). If an asynchronous task is present, the process places the task being processed into the concurrency scheduled queue (step 816) and assigns the asynchronous task as the task for processing by the thread (step 818). The process then performs the asynchronous task (step 820). The process then returns to step 808. In the illustrative examples, pending tasks are considered to have a higher priority than asynchronous tasks. In this manner, the processing tasks with a higher priority can be given by checking the concurrency scheduled queue.

With reference again to step 814, if an asynchronous task is not present, the process returns to 800 in which the thread can again try to obtain a lock for the shared data.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks can be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams can be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession can be performed substantially concurrently, or the blocks may sometimes be performed in the reverse order, depending upon the functionality involved. Also, other blocks can be added in addition to the illustrated blocks in a flowchart or block diagram.

For example, the flowchart in FIG. 8 does not show steps involved with releasing locks to shared data. These steps can be added to show the process of releasing locks. As another example, step 812 and step 810 can be performed in reverse order or at substantially the same time in the flowchart in FIG. 8.

Figure 9:
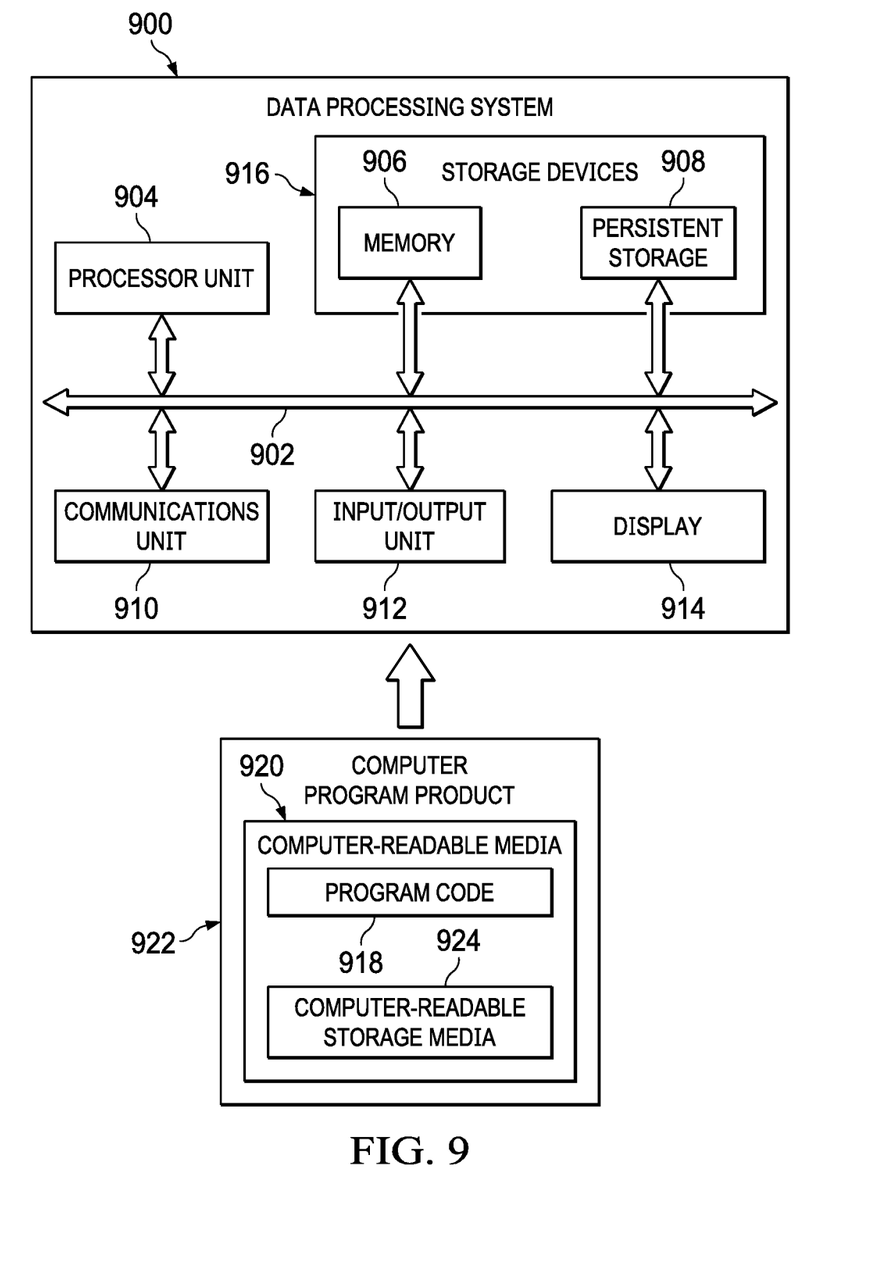
FIG. 9 is a block diagram of a data processing system in accordance with an illustrative embodiment.

Turning now to FIG. 9, a block diagram of a data processing system is depicted in accordance with an illustrative embodiment. Data processing system 900 can be used to implement server computer 104, server computer 106, and client devices 110 in FIG. 1. Data processing system 900 can also be used to implement computer system 204 in FIG. 2. In this illustrative example, data processing system 900 includes communications framework 902, which provides communications between processor unit 904, memory 906, persistent storage 908, communications unit 910, input/output (I/O) unit 912, and display 914. In this example, communications framework 902 takes the form of a bus system.

Processor unit 904 serves to process instructions for software that can be loaded into memory 906. Processor unit 904 includes one or more processors. For example, processor unit 904 can be selected from at least one of a multicore processor, a central processing unit (CPU), a graphics processing unit (GPU), a physics processing unit (PPU), a digital signal processor (DSP), a network processor, or some other suitable type of processor.

Memory 906 and persistent storage 908 are examples of storage devices 916. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 916 may also be referred to as computer-readable storage devices in these illustrative examples. Memory 906, in these examples, can be, for example, a random-access memory or any other suitable volatile or non-volatile storage device. Persistent storage 908 may take various forms, depending on the particular implementation.

For example, persistent storage 908 may contain one or more components or devices. For example, persistent storage 908 can be a hard drive, a solid-state drive (SSD), a flash memory, a rewritable optical disk, a rewritable magnetic tape, or some combination of the above. The media used by persistent storage 908 also can be removable. For example, a removable hard drive can be used for persistent storage 908.

Communications unit 910, in these illustrative examples, provides for communications with other data processing systems or devices. In these illustrative examples, communications unit 910 is a network interface card.

Input/output unit 912 allows for input and output of data with other devices that can be connected to data processing system 900. For example, input/output unit 912 may provide a connection for user input through at least one of a keyboard, a mouse, or some other suitable input device. Further, input/output unit 912 may send output to a printer. Display 914 provides a mechanism to display information to a user.

Instructions for at least one of the operating system, applications, or programs can be located in storage devices 916, which are in communication with processor unit 904 through communications framework 902. The processes of the different embodiments can be performed by processor unit 904 using computer-implemented instructions, which may be located in a memory, such as memory 906.

These instructions are referred to as program code, computer usable program code, or computer-readable program code that can be read and processed by a processor in processor unit 904. The program code in the different embodiments can be embodied on different physical or computer-readable storage media, such as memory 906 or persistent storage 908.

Program code 918 is located in a functional form on computer-readable media 920 that is selectively removable and can be loaded onto or transferred to data processing system 900 for processing by processor unit 904. Program code 918 and computer-readable media 920 form computer program product 922 in these illustrative examples. In the illustrative example, computer-readable media 920 is computer-readable storage media 924.

In these illustrative examples, computer-readable storage media 924 is a physical or tangible storage device used to store program code 918 rather than a medium that propagates or transmits program code 918.

Alternatively, program code 918 can be transferred to data processing system 900 using a computer-readable signal media. The computer-readable signal media can be, for example, a propagated data signal containing program code 918. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

The different components illustrated for data processing system 900 are not meant to provide architectural limitations to the manner in which different embodiments can be implemented. In some illustrative examples, one or more of the components may be incorporated in or otherwise form a portion of, another component. For example, memory 906, or portions thereof, may be incorporated in processor unit 904 in some illustrative examples. The different illustrative embodiments can be implemented in a data processing system including components in addition to or in place of those illustrated for data processing system 900. Other components shown in FIG. 9 can be varied from the illustrative examples shown. The different embodiments can be implemented using any hardware device or system capable of running program code 918.

Figure 10:
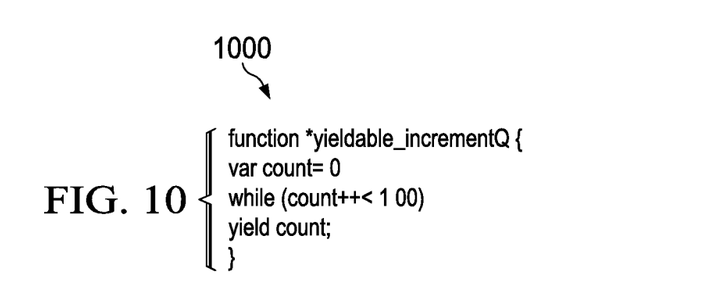
FIG. 10 is pseudo code for a nonblocking synchronization primitive in accordance with an illustrative embodiment.

With reference next to FIG. 10, pseudo code for a nonblocking synchronization primitive is depicted in accordance with an illustrative embodiment. In this illustrative example, code 1000 is an example of pseudo code that can be in nonblocking synchronization primitive 300 in FIG. 3. This pseudo code can be used to yield control to an invoking sequence and automatically store the context of a current sequence. Code 1000 is an example of the use of a generator pattern capability to define custom iteration behaviors.

As depicted, code 1000 is an example pseudo code using JavaScript semantics. Code 1000 initializes a count to zero when the function *yieldable_increment( ) is first invoked. Code 1000 advances the next sequence and executes a conditional expression pertinent to the while loop. If the conditional matches, the counters increment. Subsequent calls to the function resumes execution at the point where the execution was previously yielded instead of resuming at the beginning of the function.

Figure 11:
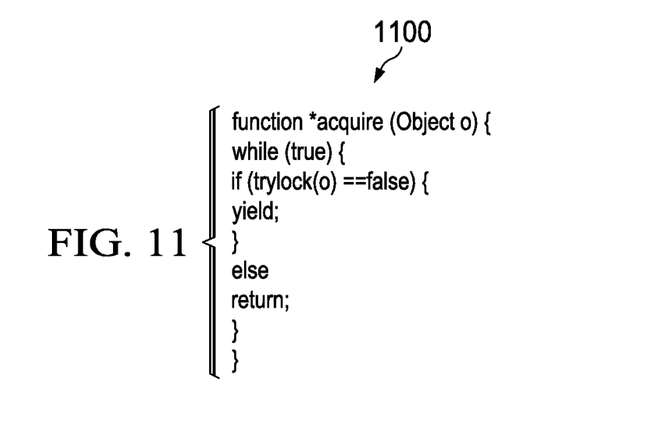
FIG. 11 is pseudo code for use in a nonblocking synchronization primitive in accordance with an illustrative embodiment.

Turning next to FIG. 11, pseudo code for use in a nonblocking synchronization primitive is depicted in accordance with an illustrative embodiment. Code 1100 is an example of pseudo code that can be implemented in nonblocking synchronization primitive 300 in FIG. 3.

As depicted, code 1100 begins when control is passed to nonblocking synchronization primitive 300 when a thread desires access to a shared computing resource. Code 1100 attempts to obtain a lock to an object that is the shared computing resource for which the thread desires access to perform a task. In this example, if the lock is not obtained, the process yields the control to another software component, concurrency controller 302.

Figure 12:
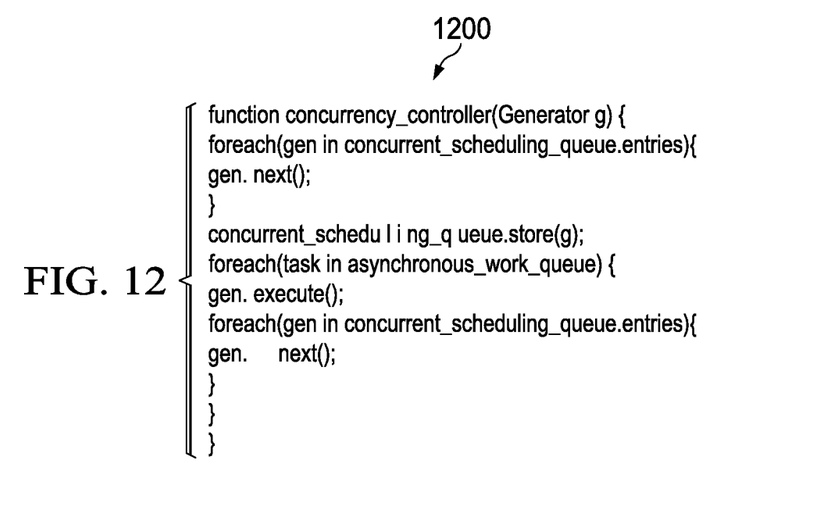
FIG. 12 is pseudo code for use in a concurrency controller in accordance with an illustrative embodiment.

With reference to FIG. 12, pseudo code for use in a concurrency controller is depicted in accordance with an illustrative embodiment. In this illustrative example, code 1200 is an example of pseudo code that can be used in concurrency controller 302 in FIG. 3.

As depicted, code 1200 saves the context for the generator object, which is for the task for which the primitive was attempting to obtain a lock. The context can be saved for future resumption using code 1000 in FIG. 10.

Code 1200 checks to determine whether a pending task is present in the concurrency scheduled queue. The pending task is a previously stopped task. If a pending task is present, the generator object for the task is betrayed and resumption operator is invoked on that generator object resuming the previously suspended task.

This processing of code 1200 continues in this manner as long as pending tasks are present in the concurrency scheduled queue.

When pending tasks are not present, an asynchronous task is obtained from the head or top of the asynchronous work queue and assigned to the thread for processing. Code 1200 checks to determine whether a pending task is present after the completion of the asynchronous task. In this manner, pending tasks that may have a higher priority can be restarted. This sequence of processing by code 1200 continues as long as asynchronous tasks are present in the asynchronous work queue.

Thus, illustrative embodiments of the present invention provide a computer implemented method, computer system, and computer program product for managing threads processing tasks for application. Responsive to a thread for an application attempting to acquire a lock to a shared computing resource to perform a task for the application, a determination is made by the computer system as to whether the lock for the shared computing resource was acquired by the thread for the application. An unrelated task for the application is assigned by the computer system to the thread in an absence of a determination that the lock was acquired.

As described herein, the illustrative examples can be used to increase the concurrency in which tasks are performed for a multithreaded application. The thread management system in the illustrative examples allow multiplexing a thread to perform two or more unrelated tasks for the multithreaded application. The selection of another task for performance occurs when a block to a shared computing resource cannot be obtained to continue performing a current task. Thus, the illustrative examples do not block or yield processor resources. Instead, a thread can continue to run and perform other tasks for the application improving the overall concurrency of the multithreaded application.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A method for managing threads running in a computer system, the method comprising:

responsive to a thread of a multithreaded application attempting to acquire a lock to a shared computing resource to perform a first task for the multithreaded application, determining, by the computer system, whether the lock for the shared computing resource was acquired by the thread of the multithreaded application to perform the first task; and responsive to determining that the thread is unable to acquire the lock to the shared computing resource to perform the first task because another thread of the multithreaded application has the lock to the shared computing resource, assigning, by the computer system, from a list of unrelated tasks provided by the multithreaded application, an unrelated second task for the multithreaded application to the thread from the list of unrelated tasks that does not access the shared computing resource, wherein the multithreaded application manages access to the shared computing resource by threads of the multithreaded application without operating system assistance to schedule the threads, and wherein the thread processes the first task at a later time when the thread acquires the lock to the shared computing resource.

2. The method of claim 1 further comprising:
performing, by the computer system, the first task for the multithreaded application in response to the lock being acquired by the thread.

3. The method of claim 1, wherein assigning, by the computer system, from the list of unrelated tasks provided by the multithreaded application, the unrelated second task for the multithreaded application to the thread from the list of unrelated tasks that does not access the shared computing resource comprises:
determining, by the computer system, whether a pending task is present for the multithreaded application; and
assigning, by the computer system, the pending task to the thread in response to the pending task being present for the multithreaded application.

4. The method of claim 3 further comprising:
saving, by the computer system, a context for the first task; and
adding, by the computer system, the first task to a concurrency scheduled queue.

5. The method of claim 1, wherein assigning, by the computer system, from the list of unrelated tasks provided by the multithreaded application, the unrelated second task for the multithreaded application to the thread from the list of unrelated tasks that does not access the shared computing resource comprises:
determining, by the computer system, whether an asynchronous task is present for the multithreaded application; and
assigning, by the computer system, the asynchronous task to the thread in response to the asynchronous task being present for the multithreaded application.

6. The method of claim 5 further comprising:
saving, by the computer system, a context for the first task; and
adding, by the computer system, the first task to a concurrency scheduled queue.

7. The method of claim 1, wherein the shared computing resource is selected from a group comprising data, a data structure, a database, a database record, a table, an array, a memory location, a cache, an output device, a printer, a display device, and an input/output port.

8. A concurrency management system comprising:
a computer system that determines whether a lock for a shared computing resource was acquired by a thread of a multithreaded application in response to the thread for the multithreaded application attempting to acquire the lock to the shared computing resource to perform a first task for the multithreaded application; and assigns, from a list of unrelated tasks provided by the multithreaded application, an unrelated second task for the multithreaded application to the thread from the list of unrelated tasks that does not access the shared computing resource in response to determining that the thread is unable to acquire the lock to the shared computing resource to perform the first task because another thread of the multithreaded application has the lock to the shared computing resource, wherein the multithreaded application manages access to the shared computing resource by threads of the multithreaded application without operating system assistance to schedule the threads, and wherein the thread processes the first task at a later time when the thread acquires the lock to the shared computing resource.

9. The concurrency management system of claim 8, wherein the computer system performs the first task for the multithreaded application in response to the lock being acquired by the thread.

10. The concurrency management system of claim 8, wherein in assigning, from the list of unrelated tasks provided by the multithreaded application, the unrelated second task for the multithreaded application to the thread from the list of unrelated tasks that does not access the shared computing resource, the computer system determines whether a pending task is present for the multithreaded application and assigns the pending task to the thread in response to the pending task being present for the multithreaded application.

11. The concurrency management system of claim 10, wherein the computer system saves a context for the first task and adds the first task to a concurrency scheduled queue.

12. The concurrency management system of claim 8, wherein in assigning, from a list of unrelated tasks provided by the multithreaded application, the unrelated second task for the multithreaded application to the thread from the list of unrelated tasks that does not access the shared computing resource, the computer system determines whether an asynchronous task is present for the multithreaded application and assigns the asynchronous task to the thread in response to the asynchronous task being present for the multithreaded application.

13. The concurrency management system of claim 12, wherein the computer system saves a context for the first task and adds the first task to a concurrency scheduled queue.

14. A computer program product for managing threads running in a computer system, the computer program product comprising:
a computer-readable storage media;
first program code, stored on the computer-readable storage media, for determining whether a lock for a shared computing resource was acquired by a thread of a multithreaded application in response to the thread for the multithreaded application attempting to acquire the lock to the shared computing resource to perform a first task for the multithreaded application; and
second program code, stored on the computer-readable storage media, for assigning, from a list of unrelated tasks provided by the multithreaded application, an unrelated second task for the multithreaded application to the thread from the list of unrelated tasks that does not access the shared computing resource in response to determining that the thread is unable to acquire the lock to the shared computing resource to perform the first task because another thread of the multithreaded application has the lock to the shared computing resource, wherein the multithreaded application manages access to the shared computing resource by threads of the multithreaded application without operating system assistance to schedule the threads, and wherein the thread processes the first task at a later time when the thread acquires the lock to the shared computing resource.

15. The computer program product of claim 14, wherein the computer system performs the first task for the multithreaded application in response to the lock being acquired by the thread.

16. The computer program product of claim 14, wherein the second program code comprises:
- program code, stored on the computer-readable storage media, for determining whether a pending task is present for the multithreaded application; and
- program code, stored on the computer-readable storage media, for assigning the pending task to the thread in response to the pending task being present for the multithreaded application.

17. The computer program product of claim 16 further comprising:
- third program code, stored on the computer-readable storage media, for saving a context for the first task; and
- fourth program code, stored on the computer-readable storage media, for adding the first task to a concurrency scheduled queue.

18. The computer program product of claim 14, the second program code comprises:
- program code, stored on the computer-readable storage media, for determining whether an asynchronous task is present for the multithreaded application; and
- program code, stored on the computer-readable storage media, for assigning an asynchronous task in the asynchronous task to the thread in response to the asynchronous task being present for the multithreaded application.

* * * * *